J. A. HEANY.
ELECTRIC WELDING.
APPLICATION FILED OCT. 7, 1912.
1,061,375.
Patented May 13, 1913.
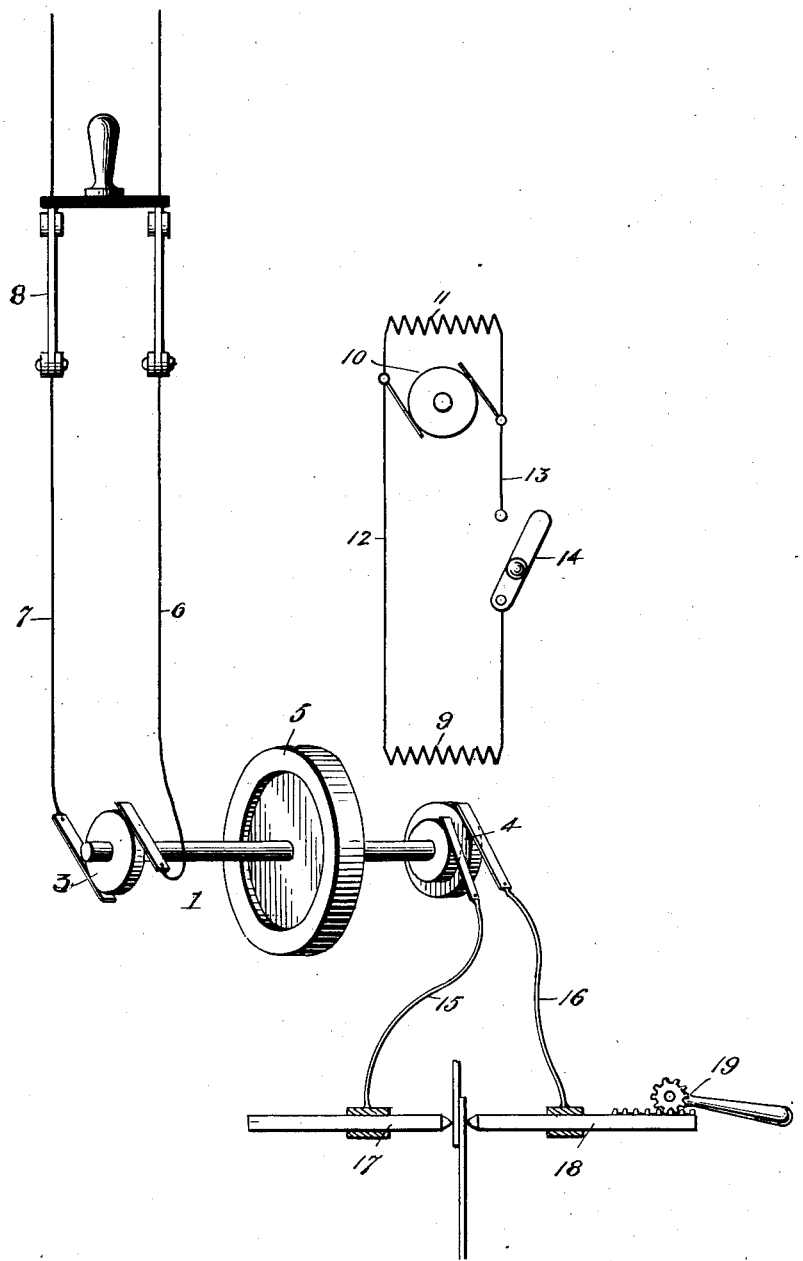

UNITED STATES PATENT OFFICE.

JOHN ALLEN HEANY, OF WASHINGTON, DISTRICT OF COLUMBIA.

ELECTRIC WELDING.

1,061,375. Specification of Letters Patent. Patented May 13, 1913.

Application filed October 7, 1912. Serial No. 724,312.

*To all whom it may concern:*

Be it known that I, JOHN ALLEN HEANY, a citizen of the United States, residing in the city of Washington, District of Columbia, have invented certain new and useful Improvements in Electric Welding; and I do hereby declare the following to be a full, clear, and exact description of the invention, such as will enable others skilled in the art to which it appertains to make and use the same.

The invention relates to electric welding and more particularly to spot welding, in which the current for effecting the welds is employed intermittently, and has for its object to provide a simple form of apparatus including an alternating current generator adapted to be driven continuously and to supply the welding current only during the actual welding operations, said generator being associated with means for storing up the energy from the power source during the inoperative periods of the generator, said storage means being adapted to deliver the stored energy to the generator when the generator is rendered active during the welding periods, whereby the welding current is instantly brought to maximum efficiency and the energy applied to the apparatus is economized and conserved.

A practical exemplification of the invention is diagrammatically illustrated in the accompanying drawing, in which—

1 is the conventional representation of a motor generator, the motor end 3 of which receives direct current from suitable mains 6 and 7 under the control of a standard switch 8, and the generator end 4 of which is designed to deliver alternating current of relatively low voltage and high amperage appropriate for use in connection with spot welding electrodes of any preferred form. The said motor generator may be constructed and controlled according to the well known principles governing such machines, and one form of governing apparatus is illustrated in the drawing, consisting of the generator field 9, which receives its excitation from a small exciting generator having an armature 10 and a field 11 connected by leads 12 and 13 to the alternating current generator field 9, the exciter circuit being under the control of a suitable switch 14, which is actuated by the welding operator. The brushes of the alternating current generator 4 are connected by relatively heavy leads 15 and 16 directly to the welding electrodes 17 and 18 between which the work is welded, one of said electrodes 18 being provided with suitable means for moving it toward and from the fixed electrode 17 such as operating device 19; whereby the welding current is directed to the work from one electrode to the other and sufficient pressure imparted to the work by the movable electrode to effect a homogeneous weld.

Associated with the alternating current generator 14, and preferably mounted on the shaft of the motor generator, is a relatively heavy fly wheel 5, which not only maintains a steady and uniform operation of the motor generator when the same is active, but also serves to store up the energy developed by the motor 3 when the generator end 4 is inactive, in the intervals between welding operations, and to deliver this stored energy to the generator 4 whenever the same is rendered electrically active, thereby causing the current output of the latter to quickly attain the desired maximum.

In operating welding machines, and more particularly spot welding machines, the welds are made successively between different parts of the work by moving the work from place to place between the electrodes and closing the circuit from the current source. In welding apparatus of this general character, as heretofore employed, it has been customary to cut off the current from the generator or the welding transformer during the intervals between welds and then either to start up the generator or switch in the transformer for each successive welding operation. The result of such procedure is to impose heavy fluctuating loads on the apparatus supplying the welding current and also to waste an appreciable time before each welding operation, necessary for the current in the generator to build up to the necessary strength to produce the welding temperature between the electrodes. In making spot welds on light material, the current to effect the weld is required for a very brief period only, and in the former apparatus it frequently happens that more current is actually wasted than is actually employed in effecting the weld. The present invention is designed to overcome these several difficulties and to provide a simple and efficient means for conserving and economizing the energy employed in spot welding and the like and to effect such results the apparatus operates as follows.

When a series of welds is to be effected, the current to the motor generator is closed at the switch 8. This causes the motor part 3 to drive the apparatus continuously until the circuit from the power source is broken. The rotation of the motor part 3 is imparted to the fly wheel 5 and also to the rotor of the alternating current generator 4, but so long as the circuit of the exciting field 9 of said generator is open, the motor generator runs idly and the speed of the shaft and the fly wheel thereon is increased above that normally required. When it is desired to effect a weld, the operator closes switch 14 which serves to excite the field 9 and causes the generator 4 to deliver a current of relatively low voltage and heavy amperage to the leads 15 and 16 and electrodes 17 and 18. As soon as the weld is completed, which, when the work is small, will be in a very short time, the switch 14 is opened by the operator, which instantly stops the generation of current in the generator 4, which, however, continues to rotate under the action of the motor section 3. The latter then speeds up the rotation of the generator section 4 and the fly wheel and thereby stores up energy in the fly wheel, which energy, when the switch 14 is again closed for a subsequent weld, is given up at once to the rotating parts of the motor generator, thereby relieving the heavy initial load which would be imposed upon the motor section 3 and the power source. As soon as the switch 14 is closed, the motor generator quickly drops to its normal speed and the current from the generator 4 is as quickly built up, so that the weld may be effected with the greatest expedition. It will be noted that when the generator section 4 is inactive, the motor section 3 is running light and absorbs compartively little energy from the mains and the energy supplied to the motor section 3 is in a large measure absorbed by the fly wheel 5, which in turn delivers its energy to the motor generator just at the time when it is most needed, namely when the generator section 4 thereof is rendered active.

The particular form of the apparatus illustrated will be understood to be merely exemplary, and the invention is not limited either to the particular apparatus disclosed or to the specific means for controlling the same. For example, instead of an alternating current generator 4 of large current capacity, the machine employed may be an ordinary rotary transformer or motor generator developing alternating current of relatively high voltage and low amperage, which is supplied to a welding transformer instead of directly to the welding electrodes. Likewise, the means for controlling the generator section of the apparatus may take any of the usual and well known forms for such purpose. Furthermore, instead of employing a motor generator, a simple alternating current generator may be driven from some mechanical power source, as, for example, a line shaft, provided, of course, that the generator is associated with means for storing up the power from the prime mover during the inactive periods of the generator and delivering the stored power instantly to the generator when the same is rendered active in supplying current to the welding electrodes, and such power storing device may conveniently take the form of a relatively heavy fly wheel operatively connected with the generator.

What I claim is:—

1. Electric welding apparatus comprising welding electrodes, an alternating current generator, means independent of the welding electrodes for intermittently energizing said generator to deliver current during the welding operations, means for constantly driving said generator, and means for storing the driving energy during the inactive periods of the generator and delivering the stored energy to the generator during the welding periods.

2. Electric welding apparatus comprising welding electrodes, an alternating current generator, means independent of the welding electrodes for intermittently energizing said generator to deliver current during the welding operations, means for constantly driving said generator, and a fly wheel operatively connected with the generator to store the driving energy and deliver the same to the generator during the welding periods.

3. Electric welding apparatus comprising welding electrodes, an alternating current generator for supplying current to said electrodes, means for constantly driving said generator, means independent of the electrodes for rendering said generator electrically inactive between welds, and means connected with said generator for storing the driving energy during the inactive periods and delivering the stored energy to the generator during the welding operations.

4. Electric welding apparatus comprising welding electrodes, an alternating current generator for supplying current to said electrodes, means for constantly driving said generator, means independent of the electrodes for rendering said generator electrically inactive between welds, and a fly wheel connected with said generator for storing the driving energy during the inactive periods and delivering the stored energy to the generator during the welding operations.

In testimony whereof I affix my signature in presence of two witnesses.

JOHN ALLEN HEANY.

Witnesses:
 FRED. B. McLAREN,
 CHAS. J. O'NEILL.